March 3, 1942. W. F. A. BUEHNER 2,275,073
LICENSE PLATE HOLDER AND LOCK
Filed Nov. 27, 1940
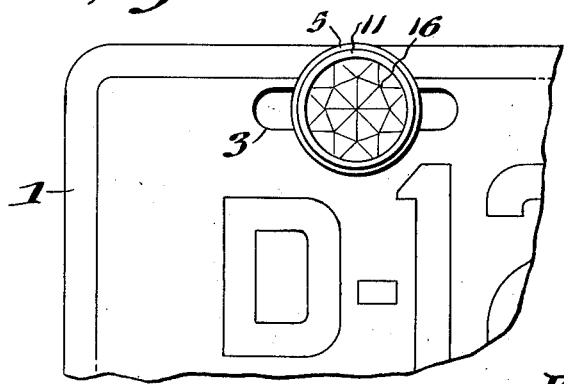
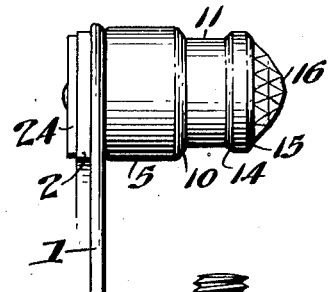
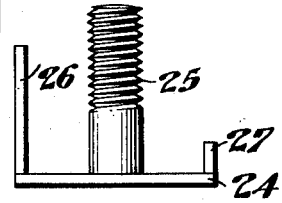
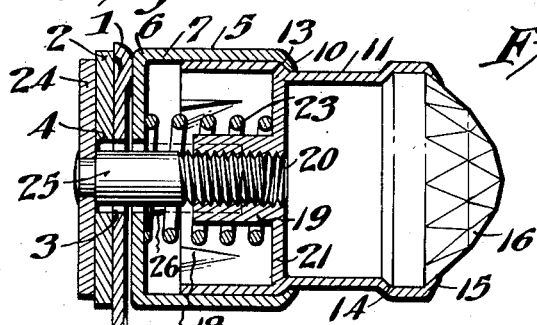
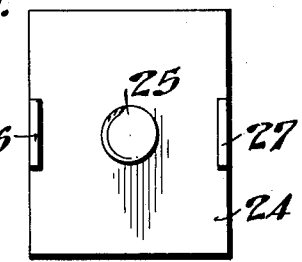
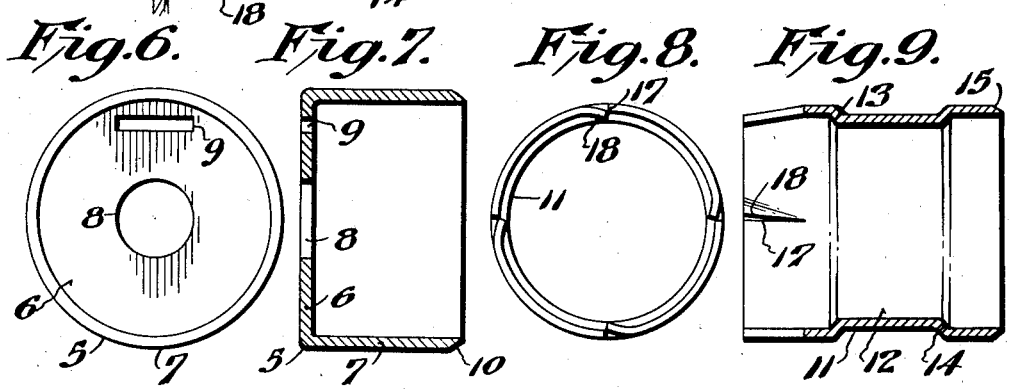
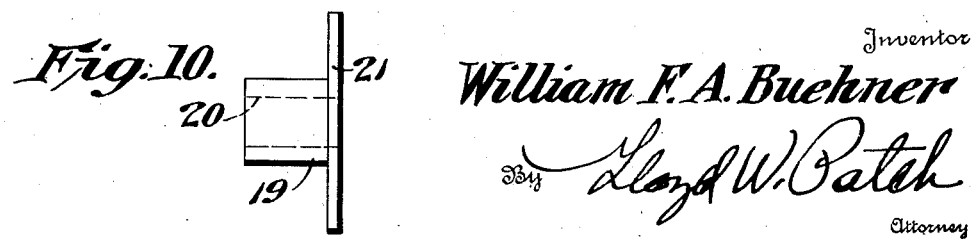
Inventor
William F. A. Buehner
By Lloyd W. Patch
Attorney Patented Mar. 3, 1942

2,275,073

UNITED STATES PATENT OFFICE 2,275,073

LICENSE PLATE HOLDER AND LOCK

William F. A. Buehner, New York, N. Y.

Application November 27, 1940, Serial No. 367,472

5 Claims. (Cl. 40—125)

My invention relates to improvements in license plate holders and locks, and particularly to such a device applicable for use in mounting and retaining an automobile license plate in place and for locking the plate against removal.

An object of this invention is to provide a device that can be used and applied to hold and mount a license plate or tag upon the usual bracket or supporting structure of an automobile, and which can be applied without the use of special tools or the requirement of specialized knowledge or manipulation of the parts.

Another object is to so construct the parts that the device will tighten down and will hold and clamp the license plate in place so that there will be no possibility of loosening or rattling of the parts.

Still another object is to provide means that will not only support the license plate in place and will hold the same against rattling or loosening, but which at the same time will serve as a lock to positively secure and lock the license plate in place so that the plate cannot be removed without destruction of or noticeable damage to the locking means.

With the above and other objects in view, some of which will be apparent to those skilled in the art and others which are inherent in the construction and use of the device and the assembly of the parts, my invention includes certain novel features of construction and combinations and associations of parts which will be hereinafter set forth in connection with the drawing and then pointed out in the claims.

In the drawing:

Figure 1 is a fragmentary view in elevation showing one corner of an automobile license plate with my invention applied thereto for holding and locking the plate in place.

Fig. 2 is a view in edge elevation of the parts shown in Figure 1.

Fig. 3 is an enlarged vertical sectional view through the license plate and mounting bracket and the holder and lock in the assembled relation.

Fig. 4 is a view in edge elevation of the locking plate.

Fig. 5 is a view in front elevation of the locking plate as shown in Fig. 4.

Fig. 6 is a view in front elevation showing the cover before assembly.

Fig. 7 is a vertical sectional view through the cover as shown in Fig. 6.

Fig. 8 is an end view showing the shell as unassembled.

Fig. 9 is a longitudinal vertical sectional view through the shell.

Fig. 10 is a view in edge elevation showing the unassembled screw sleeve.

As here illustrated, the license plate 1 and the mounting bracket 2 are of standard or usual construction, and these parts have the usual fastening receiving openings or slots 3 and 4 therethrough adapted to be in alignment or registry for reception of a fastening or holding member for mounting the tag or plate 1 on the bracket 2.

The cover 5, which can be stamped or drawn from a single piece of sheet metal, or can be made in any other desired or approved manner, is made up of an end wall 6 of substantially circular disklike form surrounded on one side by an upstanding annular wall 7. The end wall 6 is provided with a central bolt receiving opening 8, and has a closed slot or opening 9 offset therefrom adjacent to but spaced from the inner surface of the annular wall 7, and this annular wall is preferably reduced or beveled at its outer edge, as at 10, so that it may be more readily rolled down or swaged over, as will be more fully set forth hereinafter.

A shell 11, preferably made of thin gauge steel or other material that can be formed to the desired shape, and that will possess the required degree of resiliency, is preferably made of substantially elongated tubular form with the middle or waist portion of reduced diameter, as at 12, so that shoulders are provided as at 13 and 14, the edge at 15, outside of the shoulder 14, being preferably beveled or reduced in thickness so that this edge can be rolled over or swaged to hold in place a reflecting jewel or other member 16. The wall of the shell 11, in the end beyond the shoulder 13, is provided with slits or cuts extending inwardly, as at 17, and the material at one side of each cut or slit 17 is bent inwardly to provide inwardly presented ratchet teeth 18 in annular spacing around the inner wall of the shell.

The shell 11 has the jewel or reflecting member 16, or other suitable closing means, inserted within the open end thereof to rest or bear against the shoulder 14, and the edge 15 is then rolled or swaged over, substantially as shown in Fig. 3, so that the member 16 is secured in place to close this one end of the shell.

A screw sleeve 19, provided with the internal screw thread 20 in the bore thereof, has a flange or head portion 21 at one end thereof adapted to be received within the opposite end of the shell 11 and to bear against the shoulder 13, with the internally screw threaded sleeve presented outwardly, and this screw sleeve is soldered or welded or pressed in, or is otherwise rigidly secured in substantially unitary mounting within the sleeve.

The cover 5 is then fitted revolubly over the end of the shell 11 with the bolt receiving opening 8 substantially aligned with the internally screw threaded bore 20, and the edge 7 of the cover 6 is rolled or swaged down to fit over the outer side of the portion of the shell forming the shoulder 13 and consequently revolubly mount the cover upon the shell for swiveling rotational movement of the shell therein.

The portion of the shell 11 fitted and swiveled within the annular wall 7 of the cover 5 is provided with slitted openings 17, and this slitted wall portion is of relatively less length than the length or extent of the annular wall 7, as is also the internally screw threaded portion of the screw sleeve 19, so that the shell 11 is capable of relative sliding movement within the cover in an axial direction. A coil spring 23 is fitted around the screw sleeve portion 19 to bear at one end against the head portion 21 and at its other end bears against the end portion 6 of the cover 5, whereby the shell and cover are normally resiliently urged to substantially the position shown in Fig. 3 but at the same time are permitted to have relative movement against the resilient force of the spring 23.

With the parts assembled in the manner set forth, the end of the shell 11 within the cover 5 is freely rotatable and the ratchet pawl portions 18 are presented on the outer side of and adjacent to the closed slotting opening 9.

A locking plate 24, here shown as substantially rectangular in shape, but which can be of any desired or approved form, has a mounting bolt 25 thereon externally screw threaded and adapted to be received and to tighten within the threaded bore 20, when passed through the opening 8. This mounting bolt 25 is adapted to be inserted through the registering openings 3 and 4 of the automobile license plate and the bracket, and the head or supporting plate portion 24 will be against the rear side of the bracket 2 presenting the mounting bolt portion 25 projecting forwardly through the opening 3 beyond the front face of the license plate or tag 1. The cover 5, with the shell 11 carried thereby, is then moved into place so that the projecting end of the bolt 25 passes through the opening 8, and by rotating the shell 11 the screw sleeve 19 is screwed onto the bolt 25 to tighten the lock and holding means in place. As the spring 23 permits yielding movement, the cover 5 will be brought down to bear in clamping engagement against the forward side of the plate 1 and in consequence the license plate will be mounted and held upon the bracket and will be resiliently clamped against loosening and rattling.

The locking plate 24 has a locking prong 26 thereon extending substantially parallel with the axis of the bolt 25 and spaced therefrom to pass through the opening 9 when the bolt 25 is inserted through the opening 8 and is screwed into the opening 20, and this locking prong 26 is thus presented in such position that the locking pawl portions 18 will ride thereover or be pushed back as the shell 11 is revolved to turn the screw sleeve 19 onto the bolt, the locking pawl portions 18 springing back to present their pawl or locking edges so that reverse revoluble movement of the shell 11 is prevented.

With the parts constructed in the manner set forth, the holding and locking device constitutes only two parts, namely the locking plate 24 as the one part to be fitted with the bolt 25 thereof extending through the aligned openings 3 and 4 and the second part constituting the remaining portions in their assembled relation adapted to be fitted in place and to tighten upon the locking bolt when the shell 11 is rotated. As the locking prong 26 extends through the aligned slots 3 and 4, the locking plate 24 will be positively held against being revolved, and the single device will at the same time prevent loss or removal of the license plate 1, even though a second bolt or other license plate holding means, as ordinarily employed, may vibrate loose or be otherwise lost or removed. To give additional holding security a guide prong 27 can be provided on the locking plate 24 to engage in and through one or both of the registering openings 4 and 3, this guide prong however being relatively short so that it will not interfere with tightening of the cover 5 into the plate clamping and holding position.

As stated, the outer end of the shell 11 preferably carries a reflecting jewel or button 16, and the device of the present invention when mounted in place serves not only to hold the license plate in place, but positively locks the plate against removal except by readily noticeable breakage or damaging of the parts, and at the same time resiliently clamps the plate to prevent rattling and presents the reflector in position to catch and reflect the light rays to an approaching automobile or other vehicle.

While I have herein shown and described only certain specific construction and embodiment of my invention, it will be apparent to those skilled in the art that changes and variations can be made in the form and construction and arrangement and assembly of the parts, and in the manner of use, without departing from the spirit and scope of my invention.

I claim:

1. An automobile license plate holder and lock comprising a back plate having a mounting bolt receivable through aligned openings of a license plate and mounting bracket and provided with a locking prong offset laterally from and extending substantially parallel with the bolt and also receivable through the aligned openings of the license plate and bracket, a cover having openings therethrough adapted to loosely receive said locking bolt and locking prong portions, a locking shell rotatable within the cover adapted to be turned and tightened upon the locking bolt and having parts adapted to engage the locking prong to hold said shell against being reversely turned and loosened, said shell being mounted for limited endwise movement within the cover, and a spring resiliently urging the cover into extended position.

2. An automobile license plate holder and lock comprising a locking plate having a supporting bolt extending forwardly therefrom and provided with a locking prong spaced from said supporting bolt, a cover having openings freely receiving said bolt and prong portions and provided with an annular wall, a shell swiveled within the annular wall and carrying a screw sleeve adapted to be turned onto the supporting bolt, said shell having the portion thereof swiveled within the cover slitted and bent to provide pawl portions resiliently permitting rotational movement of the shell for tightening the screw sleeve onto said bolt and projecting to engage with the locking prong to prevent unscrewing movement, said shell being mounted for limited endwise movement with respect to the cover, and means resiliently holding said cover in extended position.

3. An automobile license plate holder and lock comprising a locking plate having on one side substantially parallel extending spaced locking bolt and locking prong portions, a cover having an annular wall provided with openings loosely receiving said bolt and prong, a shell swiveled in rotatable mounting within the annular wall of the cover and of less length than said wall thereby permitting limited endwise movement, a screw sleeve carried by said shell aligned to turn onto the bolt portion of the locking plate, a spring resiliently urging said cover and shell to extended positions, and pawl means on the shell engageable with said locking prong.

4. An automobile license plate holder and lock comprising a locking plate having on one side substantially parallel extending spaced locking bolt and locking prong portions, a cover having an annular wall provided with openings loosely receiving said bolt and prong, a shell swiveled in rotatable mounting within the annular wall of the cover and of less length than said wall thereby permitting limited endwise movement, a screw sleeve carried by said shell aligned to turn onto the bolt portion of the locking plate, a spring resiliently urging said cover and shell to extended positions, pawl means on the shell engageable with said locking prong, and a reflector member mounted and presented in the outer end of said shell closing access to the interior.

5. An automobile license plate holding and locking means comprising a locking plate having upstanding spaced locking bolt and locking prong portions, a cover having an annular side wall provided with a middle opening for reception of the locking bolt and an offset opening to receive the locking prong, a shell having a reduced medial waist portion providing outwardly spaced shoulders inwardly from each end having one end swiveled within the annular side wall of the cover and of less length than said side wall, a screw sleeve presented within the swiveled end of the shell turnable onto said bolt portion as the shell is rotated, a spring around said screw sleeve bearing between the cover and shell holding said parts normally resiliently separated, said shell having the swiveled end thereof slitted and bent to provide ratchet portions engageable with said locking prong to hold said shell against rotational movement to turn the screw sleeve off from the bolt, and reflector means mounted in the outer end of the shell against the shoulder thereof.

WILLIAM F. A. BUEHNER.